United States Patent [19]

Steuart

[11] Patent Number: 4,846,627
[45] Date of Patent: Jul. 11, 1989

[54] STORAGE AND HANDLING INSTALLATION FOR PALLETIZED GOODS

[76] Inventor: Douglas O. Steuart, Smithay, Dry Lane, Christow, Exeter, EX6 9PE, United Kingdom

[21] Appl. No.: 762,066
[22] PCT Filed: Dec. 3, 1984
[86] PCT No.: PCT/GB84/00416
§ 371 Date: Jul. 26, 1985
§ 102(e) Date: Jul. 26, 1985
[87] PCT Pub. No.: WO85/02387
PCT Pub. Date: Jun. 6, 1985

[30] Foreign Application Priority Data
Dec. 1, 1983 [GB] United Kingdom ............... 8332095

[51] Int. Cl.$^4$ .................................. B65G 47/00
[52] U.S. Cl. ..................... 414/786; 188/5;
188/19; 188/21; 280/79.11; 16/35 R; 414/347;
414/280; 414/331; 414/233; 414/276; 414/286;
414/584
[58] Field of Search ............ 414/607, 608, 787, 401,
414/584, 345, 347, 786, 233, 234, 239, 240, 241,
276, 280, 286; 280/79.1 A, 79.1 R, 79.3; 16/35
R; 410/77, 80, 94; 188/32, 5, 6, 19, 21

[56] References Cited

U.S. PATENT DOCUMENTS

| | | | |
|---|---|---|---|
| 2,675,134 | 4/1954 | Becker | 414/280 |
| 2,687,538 | 8/1954 | Marzillier | 188/32 X |
| 2,723,770 | 11/1955 | Gretener | 414/608 |
| 2,827,302 | 3/1958 | Skyrud | 280/79.1 R |
| 3,021,795 | 2/1962 | Hayba et al. | 414/345 X |
| 3,240,365 | 3/1966 | King | 414/280 X |
| 3,409,152 | 11/1968 | Edwards | 414/267 |
| 3,434,604 | 3/1969 | Haldimann et al. | 414/273 X |
| 3,465,897 | 9/1969 | Schumann et al. | |
| 3,514,001 | 5/1970 | De Meritt et al. | 414/607 |
| 3,522,954 | 8/1970 | Locke | 280/79.3 X |
| 3,701,396 | 10/1972 | House | 188/32 X |
| 3,805,974 | 4/1974 | Andersson et al. | 414/276 |
| 3,828,392 | 8/1974 | Bolger | 16/35 R |
| 3,927,773 | 12/1975 | Bright | 414/280 X |
| 3,934,683 | 1/1976 | Walker | 414/234 X |
| 4,023,818 | 5/1977 | Troller | 280/79.1 |
| 4,033,597 | 7/1977 | Boyer | 280/79.1 X |
| 4,137,984 | 2/1979 | Jennings et al. | 414/608 X |
| 4,197,047 | 4/1980 | Haldimann | 414/276 |
| 4,239,436 | 12/1980 | Wildenaur | 414/276 |
| 4,349,938 | 9/1982 | Fontana | 16/35 R |
| 4,362,459 | 12/1982 | Klausbruckner et al. | 414/584 |
| 4,470,750 | 9/1984 | Vockinger | 414/667 X |
| 4,527,937 | 7/1985 | Tomasello, Jr. | 414/276 X |

FOREIGN PATENT DOCUMENTS

| | | |
|---|---|---|
| 1141231 | 12/1962 | Fed. Rep. of Germany . |
| 35077 | 3/1977 | Japan ................... 188/32 |
| 177804 | 10/1983 | Japan ................... 414/277 |
| 48311 | 3/1984 | Japan ................... 414/280 |
| 542726 | 6/1971 | Switzerland . |
| 652375 | 11/1985 | Switzerland ........... 414/277 |
| 759864 | 10/1956 | United Kingdom . |
| 896483 | 5/1962 | United Kingdom . |

Primary Examiner—Robert J. Spar
Assistant Examiner—Robert S. Katz
Attorney, Agent, or Firm—Cushman, Darby & Cushman

[57] ABSTRACT

In order to increase the efficiency of space utilization in a palletized goods store in which loaded pallets (1) are arranged in rows (2, 3) with alleys (4) therebetween, each loaded pallet (1) is carried on a wheeled trolley (7A). Where it is required to introduce a loaded pallet (1A) into a space (10) present anywhere along each row (2), the wheeled trolleys are arranged to move transversely of a row whereby the loaded pallet (1A) can first be transported by a fork lift truck (11) down an alley (4) opposite to said space (10), and then moved transversely on a wheeled trolley (7A) into said space (10). In this manner, it is unnecessary for the truck (11) to effect a quarter-turn in the alley (4) whereby the latter can be of a much smaller width than normal. Where the store is to be operated on a first-in, first-out basis, the wheeled trolleys in a row are arranged for movement longitudinally of the row. In this case, loaded pallets are introduced at one end, progressively shifted down the row as new pallets are introduced, and subsequently removed from the other end. This avoids the need to access pallets intermediate the ends of a row.

1 Claim, 3 Drawing Sheets

STORAGE AND HANDLING INSTALLATION FOR PALLETIZED GOODS

The present invention relates to a storage and handling installation for palletised goods and to a method of operating the same.

Normally, in a palletised goods store, loaded pallets are arranged in side-by-side rows. Alleys are provided between at least some of the rows to enable access along the rows for fork lift trucks used to introduce and remove loaded pallets. These alleys are of substantial width since in order to introduce, or remove, a loaded pallet into a row space, the fork lift truck carrying the loaded pallet must effect a quarter turn (90° turn) in the alley to change its movement direction from along to transverse the row. Thus, for example, with 4 ft square pallets (1.22 m square) the alley width typically has to be 12 ft (3.66 m) which is very inefficient on space even where each alley serves two rows of pallets.

In order to increase the efficiency of space utilisation in palletised goods stores, it is known to use racking systems enabling two or more loaded pallets to be stored one above another. However, such systems are expensive to install.

It is an object of the present invention to provide an inexpensive way of enabling greater space utilisation efficiency in a storage and handling installation for palletised goods.

According to one aspect of the present invention, there is provided a storage and handling installation for palletised goods, said installation comprising a flat floor on which at least one row of loaded pallets is supported, characterised in that each pallet rests on a respective wheeled trolley which can roll on the floor, the trolleys in the row being movable either all in the longitudinal or all in the transverse direction of said row, depending respectively on whether pallets are to be introduced and removed solely at the ends of the row or at will anywhere in the row.

Where it is required to introduce a loaded pallet into a space present anywhere along each row, the wheeled trolleys are arranged to move transversely of a row whereby the loaded pallet can first be transported by a fork lift truck down an alley to opposite said space, and then moved transversely on a wheeled trolley into said space. In this manner, it is unnecessary for the truck to effect a quarter-turn in the alley whereby the latter can be of a much smaller width than normal, for example, 6 ft (1.83 m) in width.

Where the loaded pallets are to be removed from a row in the order in which they were introduced (such as may be the case where the goods concerned have a limited life), then an even greater saving of space can be achieved by arranging for the wheeled trolleys to be movable longitudinally of the row. In this case, loaded pallets are introduced at one end of the row, are progressively physically moved along the row as new loaded pallets are introduced, and are subsequently removed at the other end of the row. Provided both ends of the row are otherwise accessible, there is no need to provide an access alley for the fork lift truck to pass down the row, although an inspection alley my be desirable.

According to another aspect of the present invention, there is provided a storage and handling installation for palletised goods, said installation comprising a plurality of side-by-side rows of loaded pallets with access along the rows being provided by alleys passing therebetween, each loaded pallet being carried on a respective wheeled trolley arranged to move transversely of the corresponding row, the installation further comprising a fork lift unit for transporting loaded pallets along said alleys, the wheeled trolleys being used to move the loaded pallets between their positions in the rows and the adjacent alleys whereby loaded pallets can be introduced and removed from said rows at desired positions without requiring the fork lift unit to effect a quarter turn in an alley, the width of said alleys being less than the width required for the fork lift unit to effect a quarter turn.

According to a further aspect of the invention, there is provided a method of introducing a loaded pallet into a space present anywhere along an existing row of loaded pallets, said row being part of a store that comprises a plurality of side-by-side rows of loaded pallets, and alleys providing access along the rows; said method including the steps of using a fork lift unit to pick up the loaded pallet to be introduced into said space, further using the fork lift unit to transport the loaded pallet along an alley passing down one side of the row containing said space, putting down the loaded pallet in the alley opposite said space and utilising a wheeled trolley to move the pallet transversely of said row out of the alley and into said space, whereby the fork lift unit is not required to effect a quarter turn within said alley in order to introduce the loaded pallet into said space.

According to a still further aspect of the present invention, there is provided a storage and handling installation for palletised goods, said installation comprising a plurality of side-by-side rows of loaded pallets, each loaded pallet being carried on a respective wheeled trolley arranged to move longitudinally of the corresponding row whereby to enable each row to be operated as a first-in first-out store with loaded pallets being introduced at one end of the row, progressively physically moved along the row on their trolleys as new loaded pallets are introduced, and eventually removed at the other end of the row.

According to a yet further aspect of the present invention, there is provided a wheeled trolley for use in a palletised goods store, said trolley comprising a platform for receiving a loaded pallet, wheels arranged to permit free running of the trolley along one movement axis only, and releasable means for engaging a member attached to the floor of the store whereby to enable the trolley to be located in a predetermined position and subsequently released.

Embodiments of the invention will now be particularly described, by way of example, with reference to the accompanying diagrammatic drawings, in which.

Figure 1:
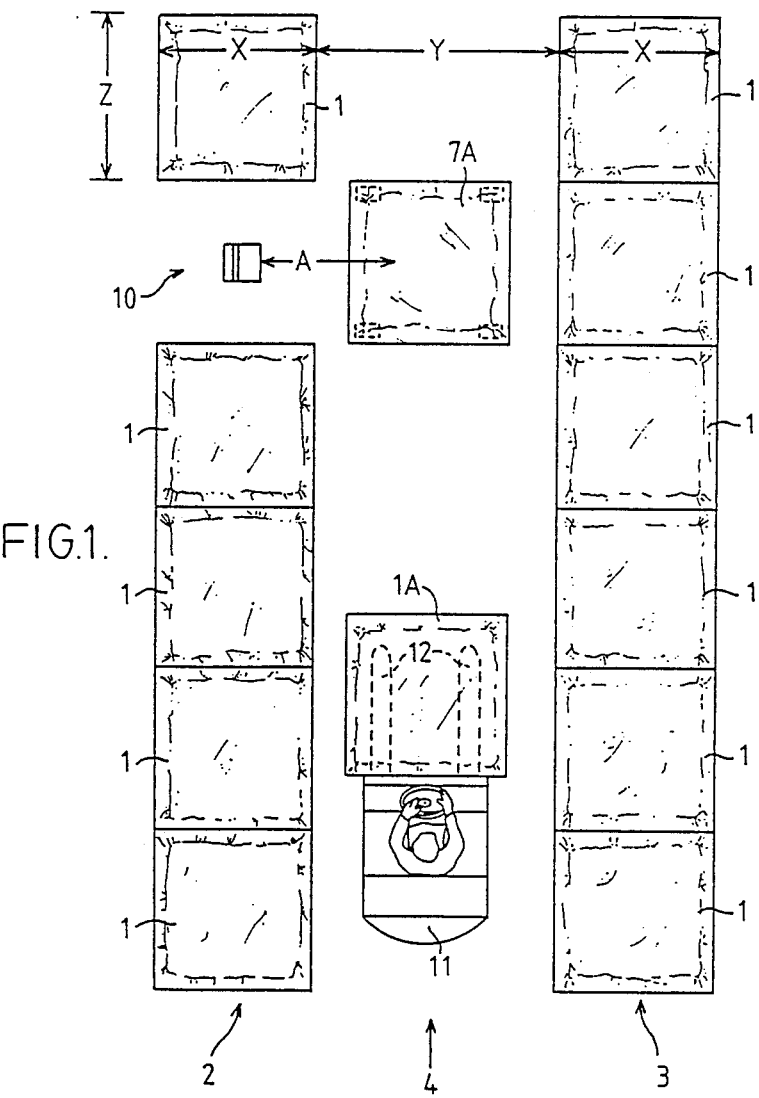
FIG. 1 is a plan view of a first form of storage and handling installation embodying the invention, the installation including a plurality of loaded pallets which are carried on respective trolleys and are arranged in rows.
Figure 2:
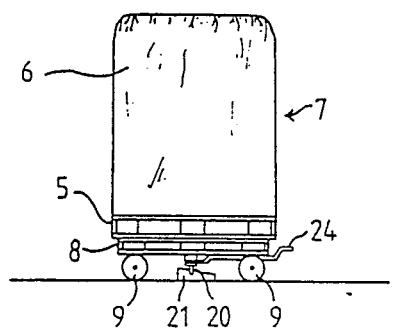
FIG. 2 is a side elevation of one of the trolley-mounted pallets shown in FIG. 1.

In the storage and handling installation shown in FIG. 1, loaded pallets 1 are arranged in two side-by-side rows 2, 3 separated by an access alley 4. As shown in FIG. 2, each of the loaded pallets 1 comprises the pallet 5 itself and goods 6 loaded onto the pallet 5. The loaded pallets 1 that already form part of the rows 2, 3 rest on respective wheeled trolleys 7 (see FIG. 2). Each trolley 7 comprises a pallet-like platform 8 mounted on wheels 9 which permit free running of the trolley along one movement axis only. In situ in a row, the trolleys 7 are aligned with their movement axes transverse the longitudinal direction of the rows 2, 3. The trolleys 7 are thus movable sideways out of a row 2, 3 into the alley 4 and vice versa.

In order to introduce a loaded pallet 1A into a vacant space 10 in one of the rows, an unloaded trolley 7A is positioned in the alley 4 opposite the space 10 with the movement axis A of the trolley 7A aligned transverse the row direction. The loaded pallet 1A is then transported down the alley 4 and placed on the trolley 7A using a fork-lift truck 11. The truck 11 is then moved back to retract its forks 12 from the loaded pallet 1A. Thereafter, the trolley 7A carrying the loaded pallet 1A is pushed into space 10 either manually or by a power device such as a transversely movable bar provided on the truck 11.

Due to the provision of the trolley 7A, it can be seen that the loaded pallet 1A can be introduced into the row 2 without the need for the truck 11 to effect a quarter turn (90° turn) in the alley 4 which would normally have been necessary. As a result, the width of the alley 4 can be substantially reduced.

By way of example, the case will now be considered where the dimensions x, z of the loaded pallets 1 are 4 l by 4 l (l being a unit of length, typically equal to 1 ft. or 0.305 m). In a prior art installation where the alleys are required to be wide enough for a fork-lift truck 11 to effect a quarter turn, the alley width y is typically 12 so that for twenty pallets arranged in two rows of ten, the total floor area required is equal to $10(4 l) (4 l + 12 l + 4 l) = 800 l^2$; this equates to $40 l^2$ per pallet. In contrast, with the FIG. 1 arrangement, the alley width y can be reduced, for example, to 6 l giving a value for the total area required for twenty pallets equal to $560 l^2$, that is, $28 l^2$ per pallet. Thus a 30% reduction in floor area is achieved.

Of course, other dimensions of pallet will give different savings in floor area. Thus with known pallets dimensioned 4 l by 5 l in which only the 5 l sides are open for insertion of the forks of a fork lift truck, use of the prior art arrangements would give values of x, y, z equal to 4 l, 12 l, 5 l (it being necessary for the 5 l sides of the pallets to lie along the rows); this gives for two rows of ten pallets a total floor area of $50 l \times 20 l = 1000 l^2$. For the FIG. 1 storing method, the 5 l sides of the pallets will lie transverse the rows giving rise to values of x, y, z of 5 l, 6 l, 4 l; in this case the floor area required for two rows of ten pallets is $640 l^2$ which is a saving of 36% over the prior art.

As an alternative to the method illustrated in FIG. 1 for introducing a loaded pallet 1A into the space 10, the loaded pallet 1A could be placed on the trolley 7A outside the alley 4 and the trolley 7A plus pallet 1 then transported down the alley to opposite the space 10 by the truck 11.

Figure 3:
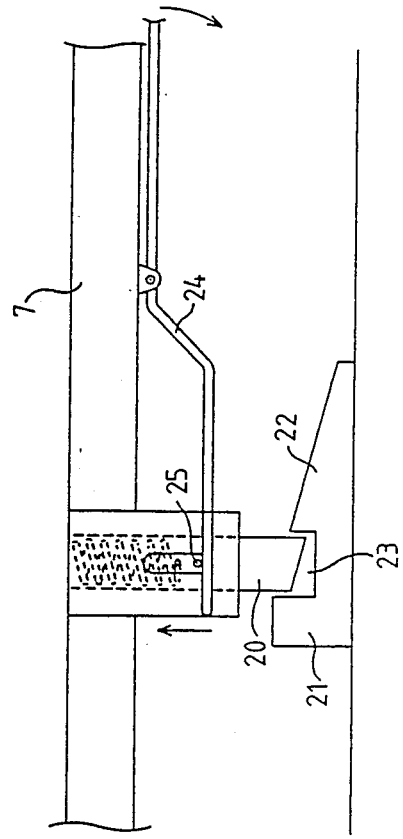
FIG. 3 is an enlarged view of releasable locating means of the trolley shown in FIG. 2.

To ensure accurate location of a loaded trolley 7 when pushed transversely into a row 2, 3, each trolley 7 is provided with a spring-loaded plunger 20 arranged to releasably engage a recessed plate 21 fixed to the floor of the installation; FIG. 3 shows this arrangement in greater detail. As can be seen, the plate 21 has an inclined camming surface 22 arranged to engage a complementarily-inclined bottom face of the plunger 20 as the trolley 7 is pushed into the row. This camming action raises the plunger 20 against its spring loading. When the trolley 7 reaches its desired location, the plunger 20 enters a recess 23 in the plate 21 and locates the trolley as desired.

To release the plunger 20 of the trolley 7 form engagement with the plate 21, a foot-operated lever 24 is provided which is pivoted on the body of the trolley 7 and engages a lug 25 projecting laterally from the plunger 20. The end of the lever 24 remote from the plunger 20 is accessible on the alley side of the trolley; depression of this end of the lever raises the plunger 20 out of the recess 23 and enables the trolley 7 to be moved transversely of the row once again.

The removal of the loaded pallet 1 from a row 2, 3 is effected in the reverse manner to the introduction of a pallet into a row.

Figure 4:
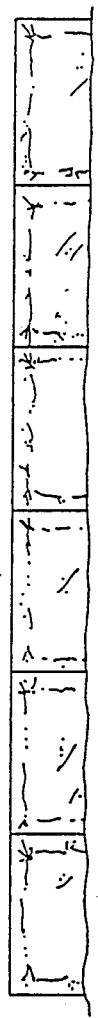
FIG. 4 is a plan view of a second form of storage and handling installation embodying the invention.
Figure 4:
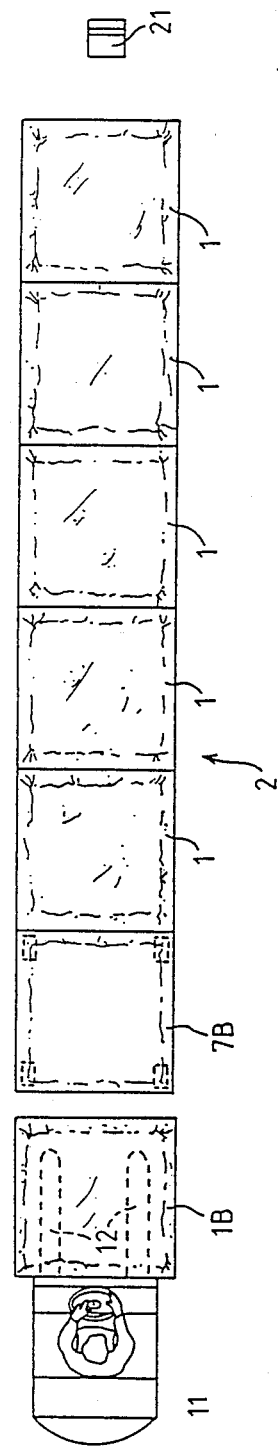

The installation shown in FIG. 4 is appropriate for situations where the loaded pallets in a row are only required to be removed in the order in which they were introduced (as may be the case where the goods 6 are to be used in date order); such a store may be referred to as in a first-in first-out store.

The FIG. 4 installation is so arranged that loaded pallets 1 are only introduced at one end of a row 2, 3 (the left-hand end in the FIGURE) and are only removed at the other end (the right-hand end), no pallets 1 being introduced at an intermediate position along a row. This is achieved by arranging the loaded pallets 1 on trolleys 7 which, in contrast to the FIG. 1 installation, have their movement axes aligned with the longitudinal direction of the row.

Considering the situation where a loaded pallet 1 has just been removed from the right-hand end of the row and a new loaded pallet 1B is to be introduced into the row, a trolley 7B is first placed at the left-hand end of the row 2 with its movement axis appropriately aligned. The pallet 1B is then placed by the fork-lift truck 11 onto the trolley 7B and the truck is backed off. The whole row 2 of loaded pallets 1 is then bodily pushed to the right until the plunger 20 of the rightmost trolley 7 engages a floor plate 21 defining an end of row position. The rightward displacement of the row could, for example, be effected by engaging the forks 12 of the truck in the pallet-like platform 8 of the newly introduced trolley 7B. The movement of the trolleys 7 can be effected by a pulling operation if the trolleys are suitably interconnected.

The removal of the rightmost loaded pallet 1 from the row 2 is simply effected by engagement of the truck forks 12 in the pallet 5 proper and then lifting and removing the loaded pallet. Subsequent removal of the associated trolley 7 is effected by raising its plunger out of engagement with the floor plate 21 using the associated lever 24. (For this latter to be easily accessible, the trolleys 7 should have been originally placed with their levers 24 accessible on their right-hand sides as viewed in FIG. 4). Once the plunger 20 has been raised, the rightmost trolley can be pulled off the row. Of course, the loaded pallet could have been left in position on the trolley 7 during the latter's removal from the row 2.

The repeated removal and introduction of loaded pallets from the row 2 of the FIG. 4 installation in the manner described above results in the progressive left to right movement of the loaded pallets 1 whereby the pallet next to be removed will always be the one longest present in the row.

Since loaded pallets are not introduced or removed at intermediate positions along the rows 2, 3, there is strictly no need for the alley 4 provided some other route is available for the truck 11 to pass between the ends of the rows. In practice the provision of at least an inspection alley is desirable. Nevertheless, the space saving resulting from the use of the FIG. 4 installation, where applicable, is considerable as can be readily shown by calculations of the type effected for the FIG. 1 installation.

From the foregoing, it can be seen that the provision of wheeled trolleys 7 for carrying the loaded pallets 1 within a row 2, 3 leads to considerable economies of space. For reasons of versatility, the trolleys 7 should be capable of use in installations both of the FIG. 1 kind and of the FIG. 4 kind; to this end, preferably (though not essentially) the platform 8 of each trolley 7 should, as described, be capable of being engaged by a fork-lift truck on at least two adjacent sides.

The trolleys 7 may have a rack-like framework on which a plurality of loaded pallets 1, or trolleys carrying pallets, may be stacked vertically. In this case it is desirable that the frameworks of neighbouring trolleys be releasably interconnected at their top and bottom ends, to increase the stability of the row of loaded trolleys.

The use of wheeled trolleys as described previously to bring about better space utilisation is also practicable where pallets are to be stacked one above another in each row. Thus, for example, each trolley 7 can be provided with a vertical rack framework enabling two or three loaded pallets to be stored one above another and individually accessed without vertical displacement of the other pallets; such a trolley could be used in an analogous manner to the single level trolley already described except now a loaded pallet can be entered into any vacant space in the trolley rack rather than just into a vacant trolley. It would also be possible to construct the rack framework separate from the trolley 7 and merely place the framework, after loading, on the trolley; such an arrangement is not, however, preferred.

Figure 5:
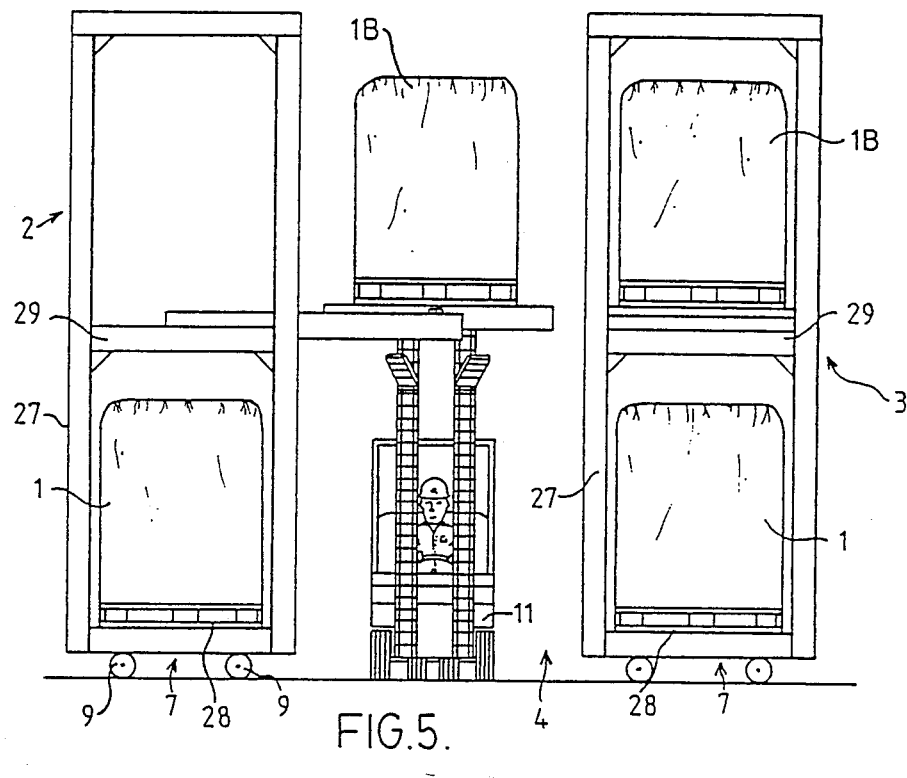
FIG. 5 is a diagrammatic end elevation of an installation such as that of FIG. 1, in which loaded pallets are stacked in each row.
Figure 6:
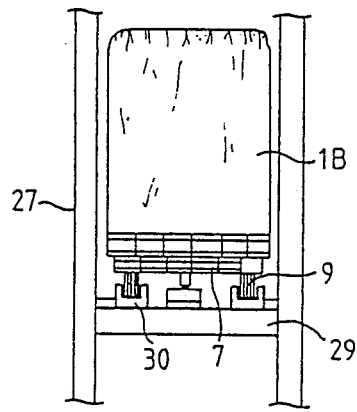
FIG. 6 is a side elevation of part of a storage and handling installation according to another embodiment of the invention.
Figure 7:
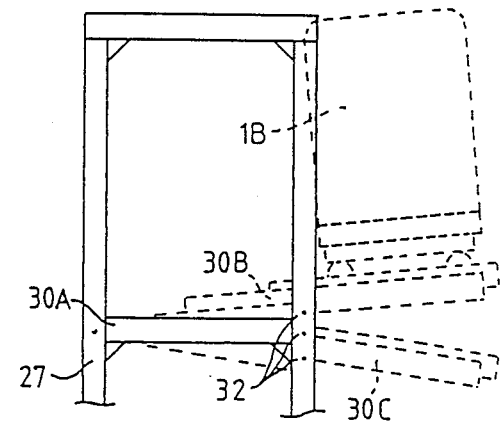
FIG. 7 is an end elevation, similar to FIG. 5, showing part of an installation in accordance with a further embodiment of the invention.

FIGS. 5, 6, and 7 illustrate different examples of vertical rack framework for stacking loaded pallets, using the principles of the present invention.

FIG. 5 is an end view of two adjacent rows 2, 3 of stacked pallets 1, the two rows 2, 3 being separated by an alley 4. Each row 2, 3 is made up of wheeled trolleys 7 the wheel axes of which extend in the direction of the respective rows 2, 3 so that each trolley 7 is movable only in a direction transverse the rows, as described previously. Each of the trolleys 7 shown in FIG. 5 has a vertical tower framework 27 made from welded steel sections and including a base platform 28 on which individual loaded pallets 1 may be stored, as illustrated, and, above this platform, horizontal supports 29 on which further loaded pallets 1B may be stacked, independently of the lowermost pallets 1. Each pallet support 29 is, in this example, made up of a pair of slidable telescopic runners, one of which is shown if FIG. 5, capable of supporting a loaded pallet 1B in a storage position within the framework, as shown on the right of FIG. 5, spaced from the other stored pallets in the framework, while being capable of horizontal sliding movement transversely of the rows 2, 3 into a loading/unloading position, shown in the left-hand rack of FIG. 5, in which the loaded pallet 1B carried thereby is supported in the alley 4 by the telescopically extended supports 29, projecting cantilever fashion from the respective trolley framework 27. In the loading/unloading position of a pallet 1B on the transversely slidable support 29 a loaded pallet 1B may be placed on or removed from the support 29 by a fork lift truck 11 moving along the alley 4 between the rows 2, 3.

The telescopic transversely slidable supports 29 may be of any suitable construction, and may, for example, comprise interlock steel channel sections with interposed ball bearings, in the manner of a cantilever drawer runner. Each transversely slidable support 29 is movable horizontally between its stowed and its loading/unloading position by applying light horizontal force transversely of the respective row, either by hand or using a tool associated with the fork lift truck 11.

As an alternative to the arrangement illustrated diagrammatically in FIG. 5, in which loaded pallets 1B are stacked vertically in a trolley framework 27, each trolley framework may be equipped with transversely extending guide rails 30, as shown diagrammatically in FIG. 6, for receiving and guiding wheeled trolleys 7, each of which is loaded with an individual pallet 1B. Each guide rail 30 may, for example, comprise a horizontal upwardly-open steel channel section supported above the level of the loaded pallet 1 below. Each guide rail 30 includes a horizontally movable sliding section movable transversely of the respective row so that it can be moved into an outwardly projecting position, supported cantilever fashion from the trolley framework 27, for loading and unloading, in a manner analogous to the horizontally movable telescopic supports 29 of FIG. 5.

In the arrangement of FIG. 6 individual wheeled trolleys 7 can be stacked in the trolley framework 27 and loaded or unloaded independently of the other loaded pallets carried by the trolley framework 27. This arrangement, like that of FIG. 5, by extending the capacity of each trolley framework 27 vertically, increases the overall storage capacity of the system, while operating on the same picking principle as that described with reference to FIG. 1. Indeed, each row 2, 3 may consist of a mixture of vertical "tower" trolley frameworks 27 and simple wheeled trolleys 7 of the kind shown in FIG. 2.

FIG. 7 illustrates diagrammatically a variant of the arrangements shown in FIGS. 5 and 6, in which each transversely slidable telescopic guide rail 30 is pivotally connected on one side of the trolley framework 27 for pivotal movement about a horizontal axis extending longitudinally of the respective row, the other end of the telescopic guide rail 30 being supported on the other side of the trolley framework by adjustable supports 3 which define three different positions, spaced apart vertically, for this end of the guide rail 30. Each guide rail 30 may therefore be set in a horizontal position 30A for storage and in two positions inclined to the horizontal in different senses, indicated 30B and 30C, for gravity-assisted loading and unloading respectively of individual loaded pallets 1A carried by the guide rails 30.

The transverse guide rails 30 in the embodiments illustrated in FIGS. 6 and 7 are provided at their laterally outer ends with stops (not shown) to limit the rolling movement of each wheeled trolley 7, or the sliding movement of each loaded pallet 1B supported thereon.

In each of the embodiments described for the "picking" of individual loaded pallets 1 and their storage in parallel rows 2, 3 separated by an alley 4, the alley 4 may be reduced considerably in order to increase the storage space, and may even be narrower than the width of the fork lift truck 11 used for loading and unloading, provided that the total width of two adjacent alleys 4 is greater than the width of the fork lift truck. When it is desired to load or unload an individual loaded pallet 1 in one of the rows the loaded pallets in that row are simply displaced to one side to increase the width of the access alley 4 sufficiently to allow the fork lift truck 11 to move along this alley to the desired position to load or unload the pallet.

Various other modifications to the described installations are, of course, possible, Thus, for example, the wheels 9 of the trolleys 7 could be swivellable or castor-mounted instead of permitting free running along one movement axis only; this latter arrangement is, however, preferred since provided the trolleys are initially correctly aligned, then their subsequent movement is predetermined to be correct. If swivellable wheels are employed it is preferable to provide means for locking the wheel swivels in one of two positions in which the wheel axes are aligned in a selected one of two mutually perpendicular directions.

With reference to the FIG. 1 installation, each trolley could take the form of a platform to which a wheel unit is connectable whenever it is desired to move a loaded pallet transversely of a row. Such a wheel unit would, of course, need to be provided with means enabling the platform to be lifted out of ground contact, supported upon the wheel unit. With trolleys of this form, only one wheel unit would be required, the loaded pallets when not being moved simply resting on their trolley platforms.

It will be appreciated that the fork lift truck 11 employed in the embodiments described could be replaced by any other fork lift unit or equivalent.

I claim:

1. A method of storing and retrieving loaded pallets comprising:

providing a plurality of rows of wheeled trolley units defining at least one access alley therebetween, the wheeled trolley units being movable transversely of said rows into at least one of said alleys;

lifting a loaded pallet onto a fork truck;

transporting the loaded pallet on the fork truck longitudinally along one of said access alleys until adjacent an empty selected one of said wheeled trolley units;

moving said selected trolley unit transversely into the access alley without turning sail selected trolley unit relative to the access alley;

placing said loaded pallet on said selected trolley unit with the fork truck; and moving said selected trolley unit with said loaded pallet transversely back into the row from which it was withdrawn, whereby loaded pallets may be stored in said rows without the necessity of providing an access alleyway therebetween wide enough for the fork truck to negotiate a one-quarter turn in.

* * * * *